United States Patent [19]

Okada et al.

[11] Patent Number: 5,612,802
[45] Date of Patent: Mar. 18, 1997

[54] CHIRAL SMECTIC LIQUID CRYSTAL DEVICE HAVING ALIGNMENT FILM OVER ELECTRODES BEING DIFFERENT AND HAVING DIFFERENT PRETILT FROM ALIGNMENT FILM BETWEEN ELECTRODES

[75] Inventors: Shinjiro Okada, Isehara; Osamu Taniguchi, Chigasaki; Hironobu Mizuno, Hiratsuka; Yutaka Inaba, Kawaguchi, all of Japan

[73] Assignee: Canon Kabushiki Kaisha, Tokyo, Japan

[21] Appl. No.: 373,537

[22] Filed: Jan. 17, 1995

Related U.S. Application Data

[60] Continuation of Ser. No. 212,913, Mar. 15, 1994, abandoned, which is a division of Ser. No. 32,017, Mar. 16, 1993, Pat. No. 5,321,537, which is a division of Ser. No. 834,391, Feb. 12, 1992, Pat. No. 5,223,963.

[30] Foreign Application Priority Data

Feb. 13, 1991 [JP] Japan .................................. 3-40608

[51] Int. Cl.$^6$ ........................................................ G02F 1/13
[52] U.S. Cl. ................................................ 349/129; 349/134
[58] Field of Search .................................. 359/78, 76, 100

[56] References Cited

U.S. PATENT DOCUMENTS

| | | | |
|---|---|---|---|
| 4,496,220 | 1/1985 | Goscianski | 359/78 |
| 4,639,089 | 1/1987 | Okada et al. | 350/341 |
| 4,655,561 | 4/1987 | Kanbe et al. | 350/350 S |
| 4,681,404 | 7/1987 | Okada et al. | 350/350 S |
| 4,682,858 | 7/1987 | Kanbe et al. | 350/334 |
| 4,709,995 | 12/1987 | Kuribayashi et al. | 350/350 S |
| 4,712,873 | 12/1987 | Kanbe et al. | 350/337 |
| 4,712,874 | 12/1987 | Sekimura et al. | 350/339 F |
| 4,712,875 | 12/1987 | Tsuboyama et al. | 350/344 |
| 4,712,877 | 12/1987 | Okada et al. | 350/350 S |
| 4,714,323 | 12/1987 | Katagiri et al. | 350/350 S |
| 4,728,176 | 3/1988 | Tsuboyama et al. | 350/350 S |
| 4,738,515 | 4/1988 | Okada et al. | 350/350 S |
| 4,740,060 | 4/1988 | Komura et al. | 350/344 |
| 4,747,671 | 5/1988 | Takahashi et al. | 350/336 |
| 4,763,994 | 8/1988 | Kaneko et al. | 350/336 |
| 4,765,720 | 8/1988 | Toyono et al. | 350/350 S |
| 4,776,676 | 10/1988 | Inoue et al. | 350/350 S |
| 4,778,259 | 10/1988 | Kitayama et al. | 350/350 S |
| 4,796,979 | 1/1989 | Tsuboyama | 350/350 S |
| 4,796,980 | 1/1989 | Kaneko et al. | 350/350 S |
| 4,802,744 | 2/1989 | Shindo et al. | 350/339 F |
| 4,818,078 | 4/1989 | Mouri et al. | 350/350 S |
| 4,824,218 | 4/1989 | Kuno et al. | 350/350 S |
| 4,859,036 | 8/1989 | Yamanaka et al. | 350/336 |
| 4,900,132 | 2/1990 | Bos | 359/100 |
| 4,932,757 | 6/1990 | Hanyu et al. | 350/339 R |
| 4,932,758 | 6/1990 | Hanyu et al. | 350/350 S |
| 4,938,574 | 7/1990 | Kaneko et al. | 350/350 S |
| 5,000,545 | 3/1991 | Yoshioka et al. | 350/336 |
| 5,005,953 | 4/1991 | Kawagishi | 359/78 |
| 5,007,716 | 4/1991 | Hanyu et al. | 350/336 |
| 5,151,804 | 9/1992 | Verhulst et al. | 359/100 |
| 5,164,852 | 11/1992 | Konuma | 359/78 |
| 5,172,255 | 12/1992 | Brosig et al. | 359/76 |
| 5,198,917 | 3/1993 | Togashi | 359/76 |
| 5,223,963 | 6/1993 | Okada et al. | 359/78 |

FOREIGN PATENT DOCUMENTS

| | | | |
|---|---|---|---|
| 210421 | 9/1987 | Japan | 359/100 |
| 245216 | 10/1987 | Japan | 359/100 |
| 66533 | 3/1988 | Japan | 359/100 |
| 3-243920 | 9/1992 | Japan | 359/100 |

*Primary Examiner*—Anita Pellman Gross
*Attorney, Agent, or Firm*—Fitzpatrick, Cella, Harper & Scinto

[57] ABSTRACT

A liquid crystal device comprising a first substrate on which a first group of belt-shaped electrodes are formed, a second substrate on which a second group of belt-shaped electrodes are formed so as to cross the first group of belt-shaped electrodes, and a chiral smectic liquid crystal arranged between the first and second, substrates. A first pretilt angle of the liquid crystal on the first group of belt-shaped electrodes differs from a second pretilt angle of the liquid crystal in the spaces among the belt-shaped electrodes. The difference in pretilt angles is created by forming a resist over the spaces between the belt-shaped electrode, rubbing, removing the resist, and rubbing again.

4 Claims, 6 Drawing Sheets

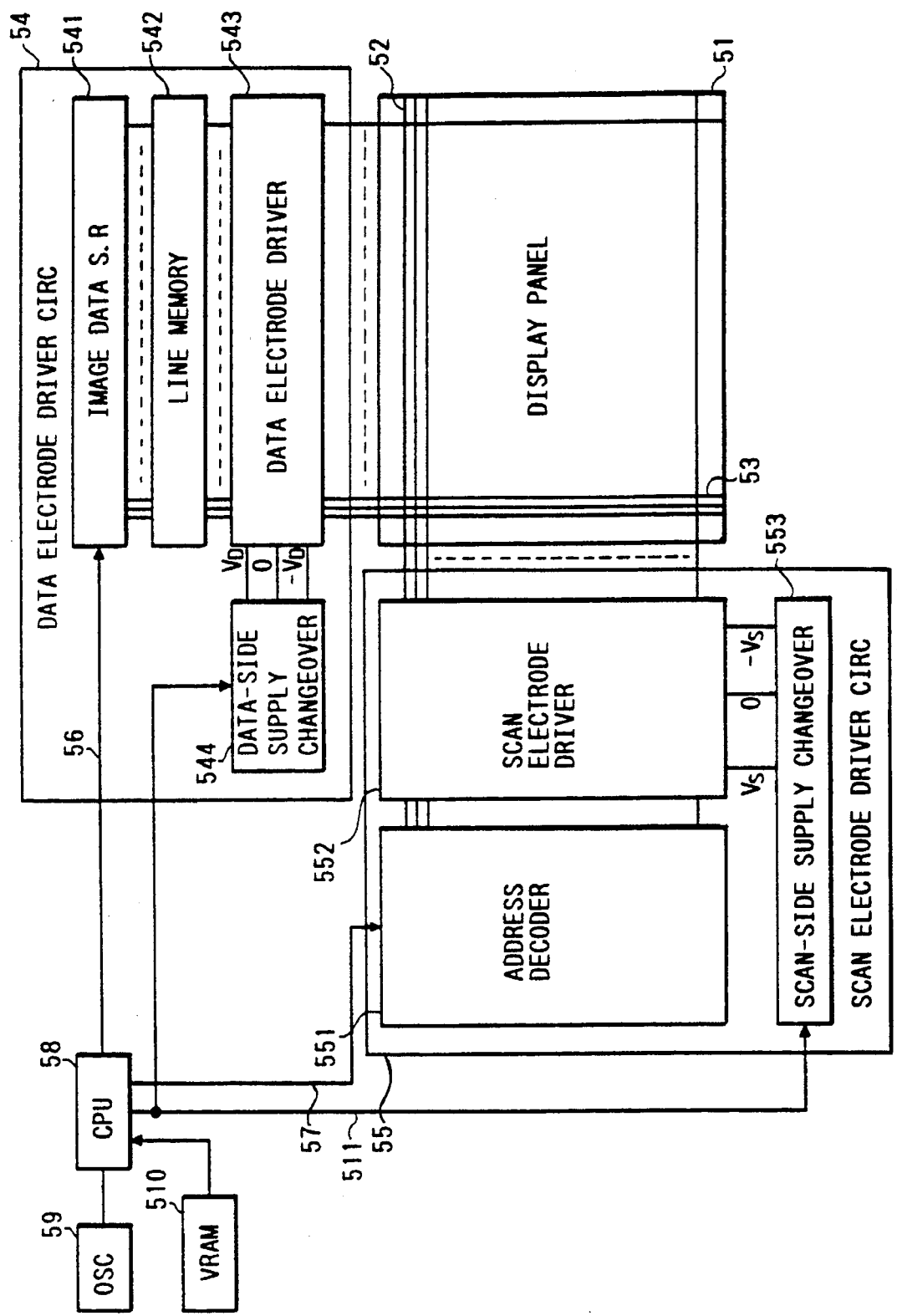

CHIRAL SMECTIC LIQUID CRYSTAL DEVICE HAVING ALIGNMENT FILM OVER ELECTRODES BEING DIFFERENT AND HAVING DIFFERENT PRETILT FROM ALIGNMENT FILM BETWEEN ELECTRODES

This application is a continuation of application Ser. No. 08/212,913, filed Mar. 15, 1994, now abandoned, which is, in turn, a division of application Ser. No. 08/032,017, filed Mar. 16, 1993, now U.S. Pat. No. 5,321,537, issued Jun. 14, 1994, which is, in turn, a division of application Ser. No. 07/834,391, filed Feb. 12, 1992, now U.S. Pat. No. 5,223,963, issued Jun. 29, 1993.

BACKGROUND OF THE INVENTION

1. Field of the Invention

The invention relates to a device using a chiral smectic liquid crystal which exhibits ferroelectricity and also relates to a display apparatus.

2. Related Background Art

With respect to a display apparatus using a ferroelectric chiral smectic liquid crystal, there have been known display apparatuses in each of which a ferroelectric chiral smectic liquid crystal (hereinafter, referred to as an FLC) is injected in a liquid crystal cell which is constructed by arranging two glass substrates in which transparent electrodes are formed on inner surfaces and an orienting process has been performed so as to face each other while keeping a cell gap of about 1 to 3 μm as disclosed in, for instance, U.S. Pat. Nos. 4,639,089, 4,681,404, 4,682,858, 4,712,873, 4,712,874, 4,712,875, 4,712,877, 4,714,323, 4,728,176, 4,738,515, 4,740,060, 4,765,720, 4,778,259, 4,796,979, 4,796,980, 4,859,036, 4,932,757, 4,932,758, 5,000,545, and 5,007,716, and the like.

Among the above background arts, in particular, a device in which the FLC is oriented by forming a chevron structure shown in FIG. 1 has excellent light state under a cross nicols, so that a large enough contrast is obtained. FIG. 1 shows a cross sectional view an orienting state of the FLC arranged between substrates 11 and 12. An FLC 13 forms a layer 15 comprising a plurality of liquid crystal molecules 14. A plurality of layers 15 are aligned in the same direction and a structure in which the layers 15 are bent occurs. At this time, it is preferable that the major axis of the liquid crystal molecule 14 is inclined or the substrates 11 and 12 at a pretilt angle of, preferably, 5° or more. As for the above aligning slate, it is desirable that the orienting process is performed to the substrates 11 and 12 by rubbings 16 an 17 in the same direction.

FIG. 2 is a plan view of the device in which the FLC 13 of the above chevron structure is formed. Reference numeral 21 in FIG. 2 denotes a sealing material to seal the subtrates 11 and 12. Although not shown, in the above device, a plurality of a first group of belt-shaped electrodes to apply a voltage are arranged on the substrate 11, and a plurality of second group of belt-shaped electrodes are arranged on the substrate 12 so as to cross the first group of belt-shaped electrodes, hereby forming matrix electrodes. A normal line 22 (on a plane surface) of the layer 15 of the FLC 3 is substantially parallel with the rubbing directions 16 and 17. In the device shown in FIG. 2, the liquid crystal molecules 14 are uniformly tilted to the left (on the plane surface) at an angle of +θ (spontaneous polarization is set to a polarity directing from the upper portion of the paper surface to the lower portion).

According to the experiments by the inventors et al., by applying a voltage (for instance, AC voltage of +8 volts at 10 Hz) across the upper and lower electrodes of the above matrix electrodes under such a state, the liquid crystal molecules 14 start flowing toward the right side in the layer 15. When such a voltage is continuously applied for a long time (for instance, 20 to 50 hours), as shown in FIG. 3. a region 31 in which the umber of liquid crystal molecules 14 has decreased or which has been depleted occurs in the left side portion. On the other hand, a region 32 in which the number of liquid crystal molecules 14 has increased is formed in the right side portion. The inventors consequently have discovered a problem: that a interference color appears over the whole plane surface of the device and the display quality is lost.

In the case where the liquid crystal molecules 14 in FIG. 2(c) are tilted to the right (on the plane surface) at an angle of −θ (spontaneous polarization is set to a polarity directed from the lower portion on the paper surface to the upper portion), it has been also found out that the liquid crystal molecules start flowing toward the left side on the contrary to the above case.

SUMMARY OF THE INVENTION

It is an object of the invention to provide a liquid crystal device or a display apparatus which can solve or suppress the above problems.

According to the invention, there is provided a liquid crystal device having a first substrate on which a first group of belt-shaped electrodes are formed, a second substrate on which a second group of belt-shaped electrodes are formed so as to cross the first group of belt-shaped electrodes, and a chiral smectic liquid crystal arranged between the first and second substrates, wherein a first pretilt angle of the liquid crystal on the first group of belt-shaped electrodes differs from a second pretilt angle of the liquid crystal in the spaces among the belt-shaped electrodes.

BRIEF DESCRIPTION OF THE DRAWINGS

FIG. 5 is a block diagram of a display apparatus of the invention; and

DETAILED DESCRIPTION OF THE PREFERRED EMBODIMENTS

Figure 4A:
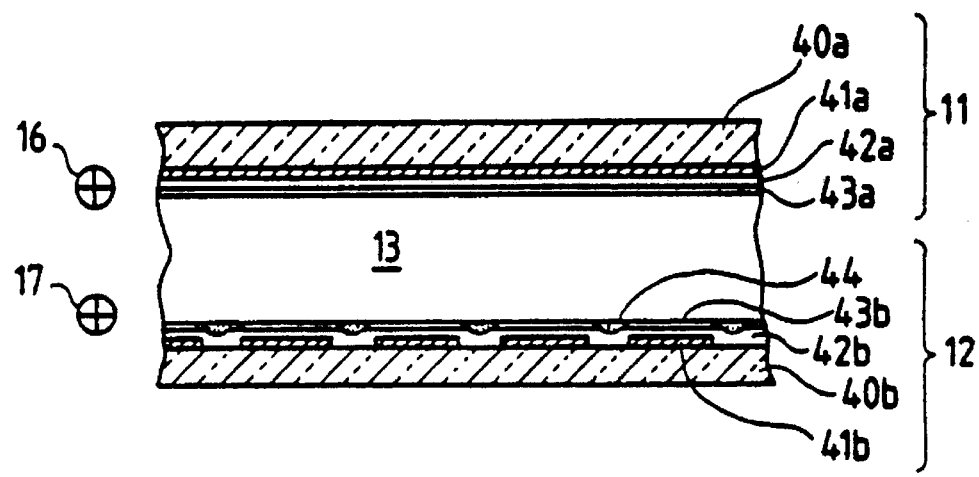
FIG. 4A is a plan view showing a device of the invention.
Figure 4B:
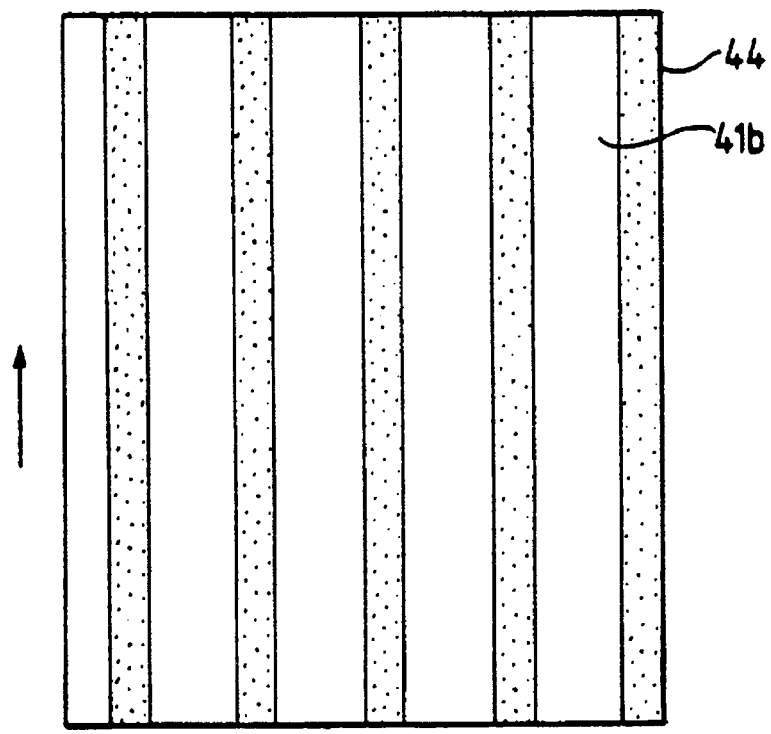
FIG. 4B is a plan view of a substrate 12 used in the device of the invention.

An embodiment of he invention is shown in FIGS. 4A and 4B. The substrate 11 in FIG. 4A is constructed by: a glass substrate 40a; a first group of belt-shaped electrodes 41a; a film 42, of an inorganic insulating material such as tantalum oxide ($Ta_2O_5$) or the like; and a homogeneous orientation film 43a such as a polyimide film which has been rubbing processed. The substrate 12 is constructed by: a glass substrate 40b; a second group of belt-shaped electrodes 41b (which cross the belt-shaped electrodes 41a); a film 42b of an inorganic insulating material such as tantalum oxide ($Ta_2O_5$) or the like; an orientation film 43b such as a polyimide film the same kind as the orientation film 43a) which has been rubbing processed; and second homogeneous orientation films 44 arranged in spaces among the belt-shaped electrodes 41b.

The first group of 5 belt-shaped electrodes 41a and the second group of belt-shaped electrodes 41b are formed by transparent conductive films having thicknesses in a range from 300 Å to 3000 Å. In addition to $Ta_2O_5$, $TiO_2$, $SnO_2$, or the like can be used as a film of the inorganic insulating material and such a film is formed so as to have a thickness within a range from 500 Å to 5000 Å.

As for the substrate 12, by pattern-processing an ITO (indium tin oxide) film having a thickness of 1000 Å formed on the glass substrate 40b by a predetermined photo lithography, the belt-shaped transparent electrodes 41b are formed on the glass substrate 40b and, after hat, a $Ta_2O_5$ film having a thickness of 1000 Å is formed by a sputtering method. Further, a polyamic acid film as a precursor of the polyimide film is formed in the $Ta_2O_5$ film. After that, by sintering the substrate 12, a polyimide film containing fluorine having a thickness of 300 Å and serving as an orientation film 42b is formed. After that, resist films are further formed in the portions corresponding to the belt shaped transparent electrodes 41b. Subsequently, the substrate 12 is strongly rubbed along the longitudinal direction of the belt-shaped transparent electrodes 41b by an acetate planted blanket in which a wool height is equal to about 2 mm.

The above rubbing process is executed by a method whereby the glass substrate is moved at a speed of 10 mm/sec, two drums each having a diameter of 100 mm and around each of which an acetate planted blanket is adhered are rotated at a rotational speed of 1000 r.p.m. in the progressing direction of the glass, and the drums are come into contact with the glass surface.

At that time, the wools of the rubbing cloth are depressed to the glass substrate by only a length of 0.3 mm. Such a rubbing process which has been executed as mentioned above provides a "strong" rubbing effect. An angle (pretilt angle) between the major axis of the liquid crystal molecule and the interface of the substrate is set to a slightly small value on the substrate surface.

After the strong rubbing process was performed, the resist is peeled off and the substrate is cleaned by a pure ware and is dried. After that, the pixel portions are "weakly" rubbed in the same direction as that between the pixels.

The rubbing processing conditions are set such that the glass substrate is moved at a speed of 40 mm/sec and is rubbed by or by rubbing drum at a rotational speed of 1000 r.p.m.

The "strong" rubbing portion (space portions between the transparent electrodes 41b) which has been rubbed as mentioned above has a pretilt angle of about 10°, while the "weak" portion belt-shaped transparent electrodes 41b) 44 has a pretilt angle of 18°.

It has been confirmed from the experiments that the molecules in the liquid crystal layer largely move when the pretilt angle is large and that they move small when the pretilt angle is small.

In the embodiment, although the pretilt angles are set to 10° and 18°, it is desirable that the portion (space portion 44 between the pixels has a further small pretilt angle. For instance, according to a method whereby PVA (polyvinyl alcohol) is coated after the surface on the resist was "strongly" rubbed, the pretilt angle of the portion between the pixels is reduced to about 0°.

In the case of coating PVA, since the PVA film is also peeled off at the stage in which the resist is peeled off, it is necessary to set a thickness of PVA film to 1000 Å or more.

According to the device shown in FIGS. 4A and 4B FLCs 13 in the intersecting portions among the first group of belt-shaped electrodes 41a and the second group of belt-shaped electrodes 41b are in an alignment state of a chevron structure formed by the liquid crystal of a pretilt angle of 18°. On the other hand, the FLCs in the non-intersecting portions are in an alignment state of the chevron structure formed by the liquid crystal of a pretilt angle of 10°.

According to the invention, the processes performed to the substrate 12 as mentioned above are also applied to the substrate 11. The pretilt angle of the liquid crystal on the belt-shaped transparent electrode 41a can be set to 18°. The pretilt angle of the liquid crystal in the space between the belt-shaped transparent electrodes 41a can be set to 10°.

According to the invention, the pretilt angles of the liquid crystals on the belt-shaped transparent electrodes 41a and/or 41b are preferably set to 15° or more and, more particularly, they are desirable set to angles within a range from 17° to 45°. By setting the pretilt angle of the liquid crystal in the space between the belt-shaped transparent electrodes to an angle within a range from 5° to 15°, the above problems can be effectively suppressed or solved.

Figure 1:
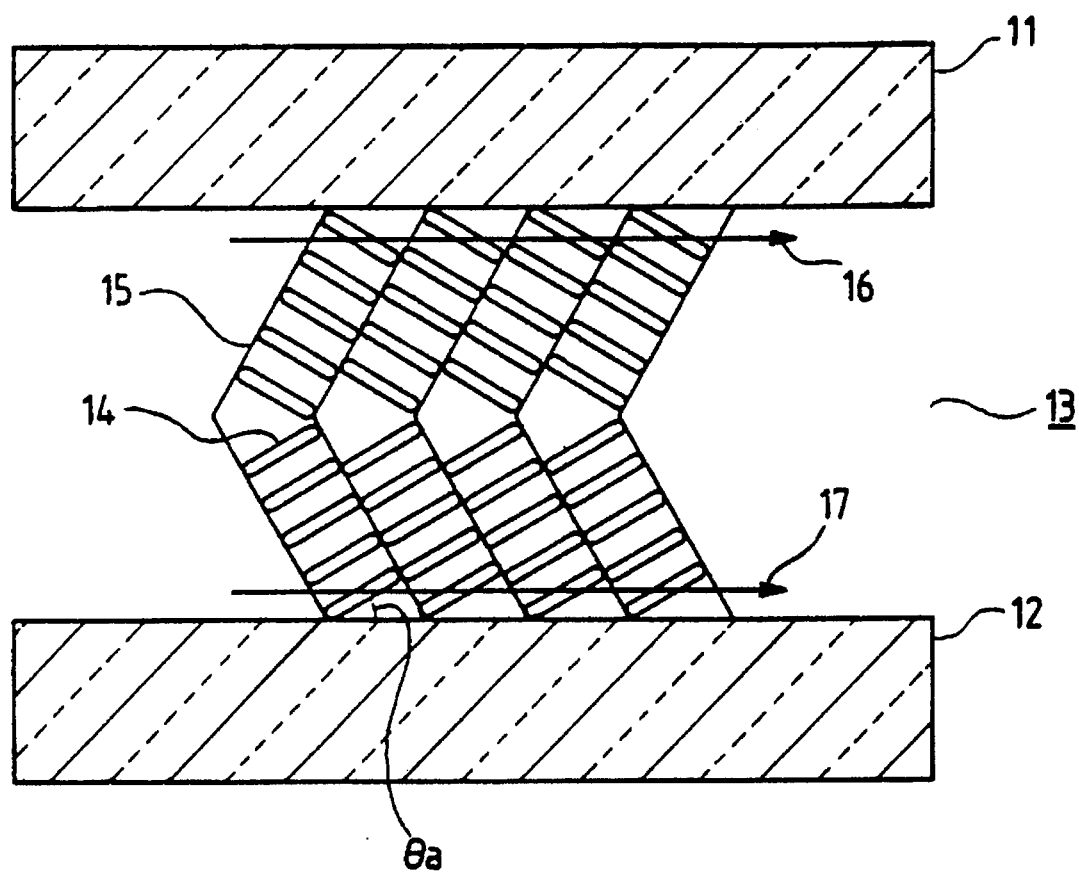
FIG. 1 is a cross sectional view showing a liquid crystal aligning state used in the invention.
Figure 2A:
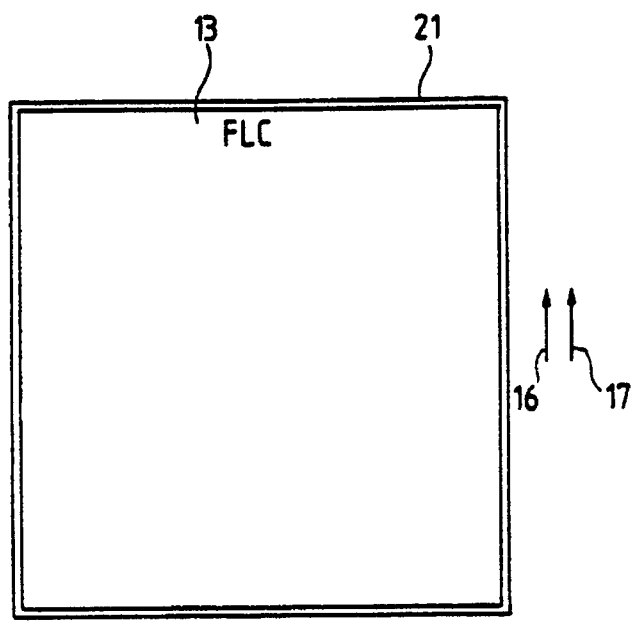
FIG. 2(a) is a plan view of FIG. 1.
Figure 2B:
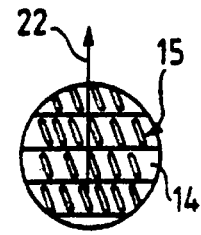
FIG. 2(b) is an enlarged plan view of FIG. 2(a)
Figure 2C:
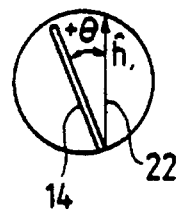
FIG. 2(c) is an enlarged plan view of FIG. 2(b)

FIG. 5 is a block diagram illustrating a structural arrangement of an embodiment of the display apparatus according to the present invention. A display panel 51 (shown in FIG. 4) is composed of scanning electrodes 52, data electrodes 53, and an FLC having the chevron structure shown in FIG. 1 and disposed therebetween. The orientation of the ferroelectric liquid crystal is controlled by an electric field at each intersection of the scanning electrodes and data electrodes formed due to voltages applied across the electrodes.

The display apparatus includes a data electrode driver circuit 54, which in turn comprises an image data shift register 541 for storing image data serially supplied form a data signal line 56, a line memory 542 for storing image data supplied in parallel from the image data shift register 541, a data electrode driver 543 for supplying voltages to the data electrodes 53 according to the image data stored in the line memory 542, and a data side power supply changeover unit 544 for changing over among voltages $V_D$, 0, and $-V_D$ supplied to the data electrodes 53 based on a signal from a changeover control line 511.

The display apparatus further includes a scanning electrode driver circuit 55, which in turn comprises a decoder 551 for designating a scanning electrode among all of the scanning electrodes based on a signal received from a scanning address data line 57, a scanning electrode driver 552 for applying voltages to the scanning electrodes 52 based on a signal from the decoder 551, and a scanning side power supply changeover unit 553 for changing over among voltages $V_S$, 0, and $-V_S$ applied to the scanning electrodes 52 based on a signal from the changeover control line 511.

The display apparatus further includes a CPU 58, which receives clock pulses from an oscillator 59, controls an image memory 510, and controls the signal transfer over the data signal line 56, scanning address data line 57, and changeover control line 511.

Figure 6:
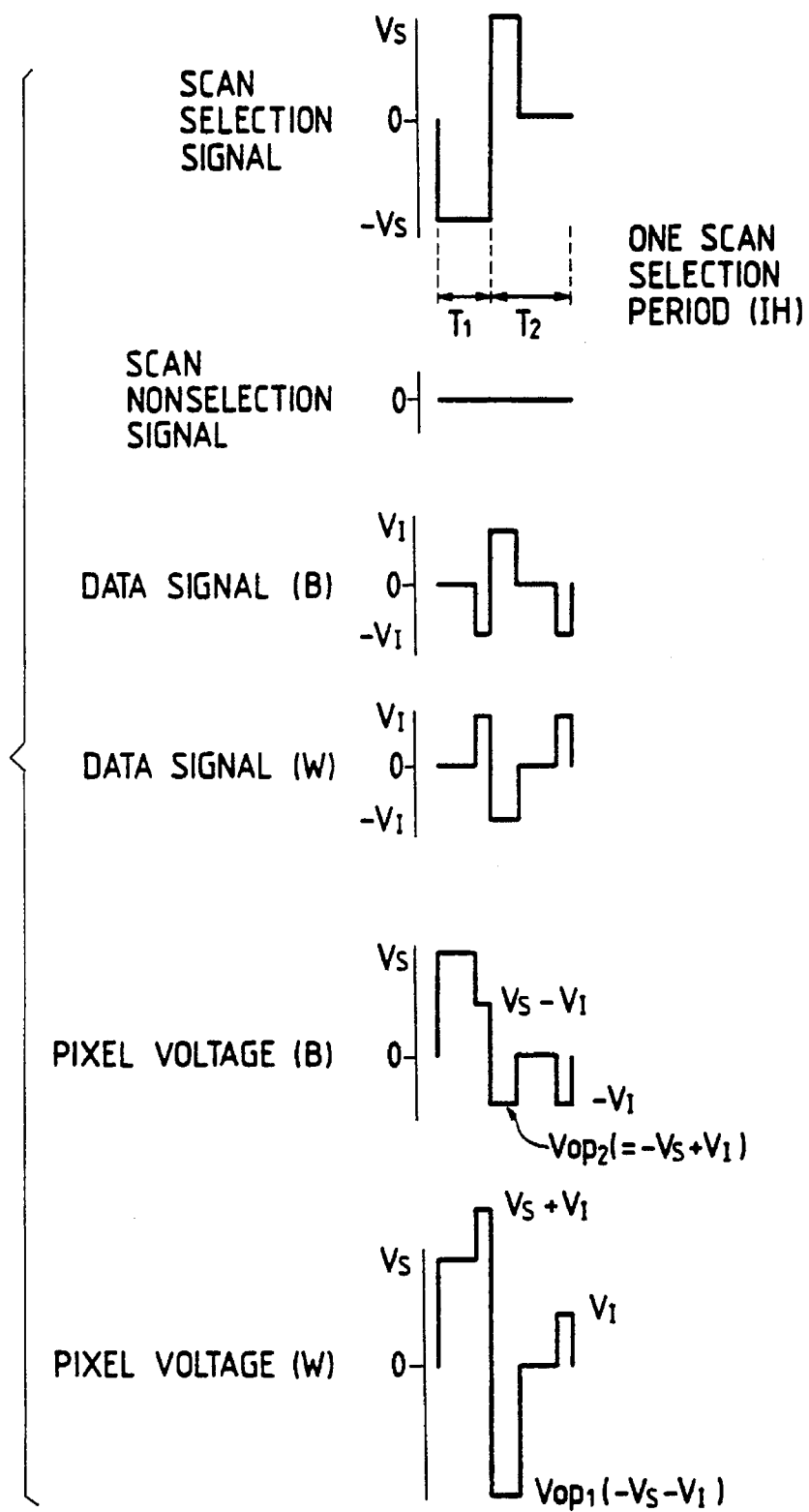
FIGS. 6 and 7 are waveform diagrams showing driving waveforms used in the invention.

FIG. 6 shows a set of drive voltage signal waveforms used in the present invention. In one scanning selection period, a scanning selection signal having alternating voltages $+V_S$ and a voltage 0 is applied to a scanning electrode, wherein the voltages $\pm V_S$ and the voltage 0 are values defined with reference to the voltage level of a scanning non-selection signal. The data electrodes are supplied with a black or white data signal depending on given data. In the embodiment, the pixels on a scanning electrode supplied with a scanning selection signal are simultaneously erased into a black state in a period $T_1$ during one scanning selection period, and then in a subsequent period $T_2$, a pixel supplied with a data signal (B) is set to a black state and a pixel supplied with a data signal (W) is set to a white state.

In the apparatus of the present invention, temperature compensation may be effected by modulating (changing) the length of one scanning selection period (1H) and the magnitude a drive voltage peak value $V_{OP}$ (capable of writing black or white) which is $V_{OP1}$ or $V_{OP2}$ giving a maximum value during the period $T_2$.

Figure 7:
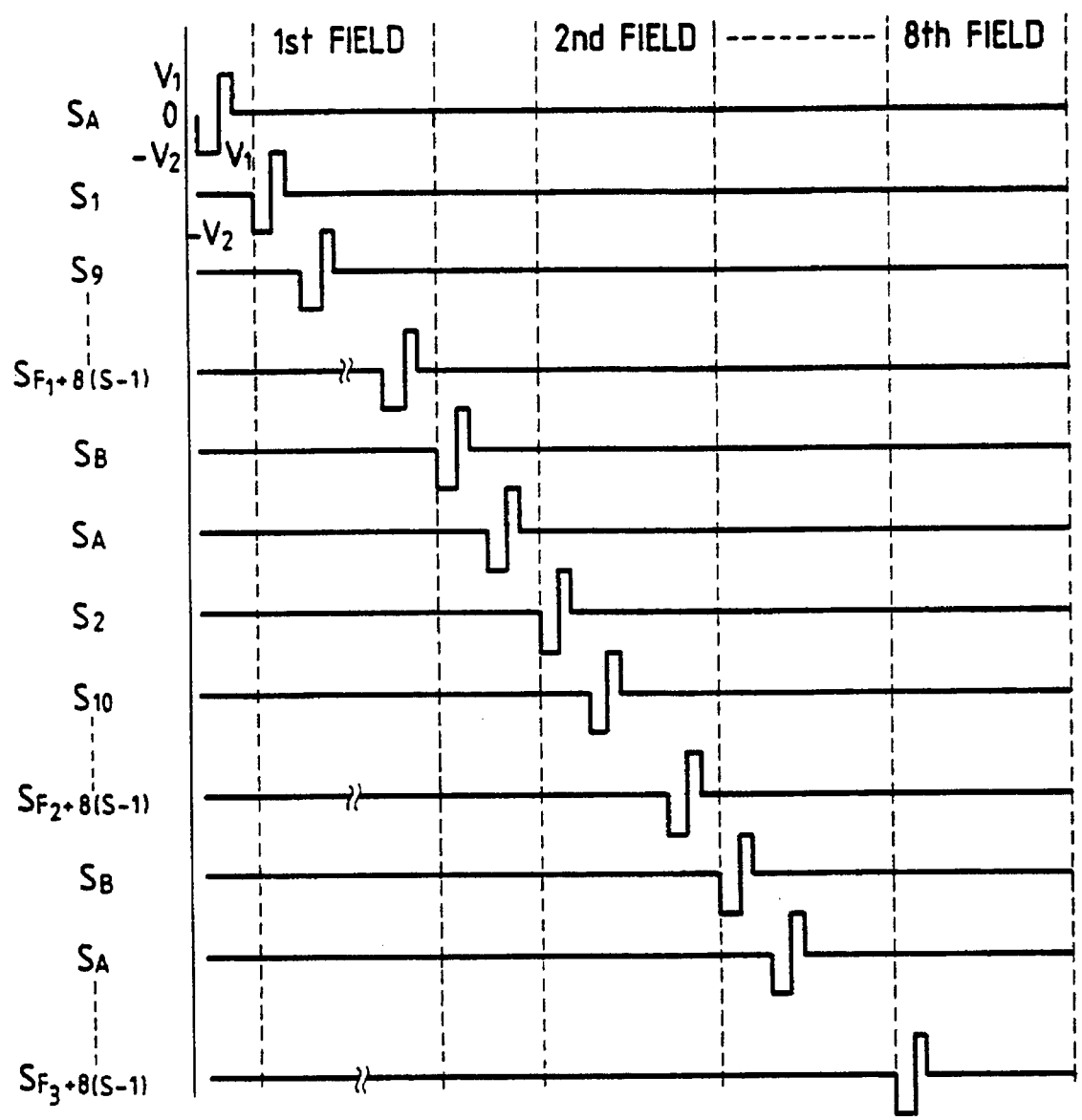

FIG. 7 is a waveform diagram showing an example of a sequence of applying a scanning selection signal shown in FIG. 6 to the scanning electrodes. According to the scanning sequence shown in FIG. 7, a scanning selection signal is sequentially applied to the scanning electrodes $S_1, S_2, \ldots, S_{F8+8(s-1)}$ every 8th electrode (7 electrodes apart) in one vertical scanning (field scanning) and one picture is formed through 8 times of field canning to complete one frame scanning. In this instance in each field scanning, the scanning section signal is also applied to the scanning electrodes $S_A$ and $S_B$ in the non-display region. In FIG. 7, the symbols $F_1, F_2, \ldots, F_8$ each represents ordinal number of field scanning in one frame scanning and the symbol s represents an ordinal number of scanning in one field scanning.

A series of experts were conducted wherein the above-mentioned display operation was repeated by using a ferroelectric liquid crystal panel with the dimensions and drive conditions as shown below and the driving signal waveforms shown in FIGS. 6 and 7 while applying the scanning selection signal to the scanning electrodes 52 electrodes apart (in every 8th electrode).

What is claimed is:

1. A chiral smectic liquid crystal display device, comprising a first substrate provided with a first plurality of electrodes;

a second substrate provided with a second plurality of electrodes facing and intersecting said first plurality of electrodes to define a matrix arrangement of pixels;

a chiral smectic liquid crystal interposed between said first and second substrates; and first and second orientation films formed on at least one of said first and second substrates: said first orientation film formed corresponding to and on said plurality of electrodes on said substrate, said second orientation film formed corresponding to and between said electrodes to fill step configuration between said electrodes, wherein said first orientation film provides a pre-tilt angle of said liquid crystal which is different from a pre-tilt angle provided by said second orientation film, and a pre-tilt angle of said liquid crystal disposed at a region where said first electrodes and said second electrodes are opposed to each other is different from a pre-tilt angle of said liquid crystal at a region where said first and second electrodes are not opposed to each other.

2. A device according to claim 1, wherein said first orientation film provides the pretilt angle greater than that provided by said second orientation film.

3. A device according to claim 1, wherein said first and second orientation films are formed of an insulating material.

4. A device according to claim 1, wherein said first orientation film is made of at least a polyamide film containing fluoride.

\* \* \* \* \*

UNITED STATES PATENT AND TRADEMARK OFFICE
CERTIFICATE OF CORRECTION

PATENT NO.   :   5,612,802
DATED        :   March 18, 1997
INVENTOR(S)  :   SHINJIRO OKADA ET AL.

It is certified that error appears in the above-identified patent and that said Letters Patent is hereby corrected as shown below:

On drawing

SHEET 2 OF 6

Figure 3:
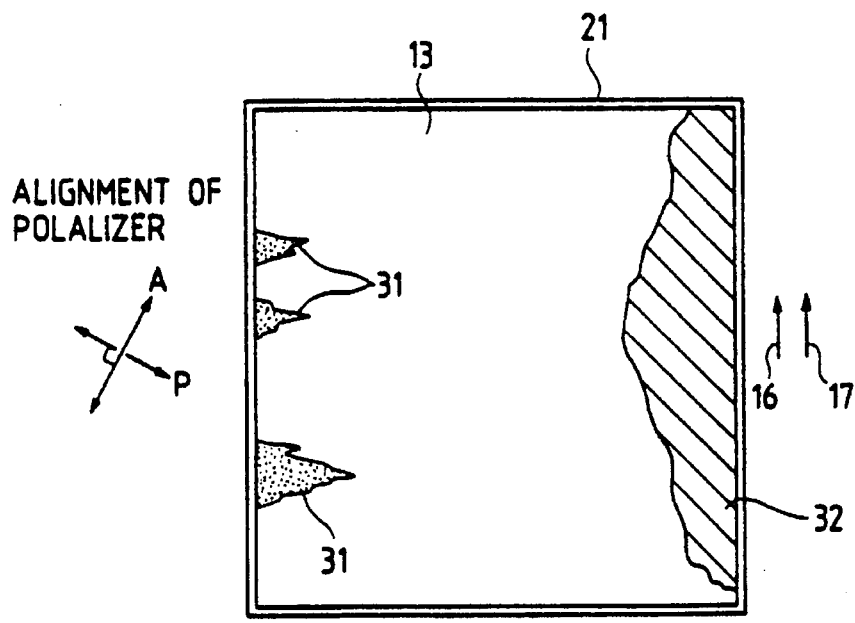
FIG. 3 is a plan view showing a state in the case where a conventional device is used.

FIG. 3, "POLALIZER" should read --POLARIZER--.

COLUMN 1

Line 42, "view" should read --view of--.
    Line 48, "or" should read --for--.
    Line 50, "slate," should read --state,--.
    Line 51, "an" should read --and--.
    Line 56, "subtrates" should read --substrates--.
    Line 60, "second" should read --a second--.
    Line 62, "hereby" should read --thereby--.
    Line 63, "FLC 3" should read --FLC 13--.

COLUMN 2

Line 1, "directing" should read --directed--.
    Line 3, "inventors et al.," should read --inventors,--.
    Line 4, "+8 volts" should read --$\pm$8 volts--.
    Line 10, "umber" should read --number--.
    Line 15, "a" (second occurrence) should read --an--.
    Line 63, "he" should read --the--.
    Line 66, "film 42," should read --film 42a,--.

UNITED STATES PATENT AND TRADEMARK OFFICE
CERTIFICATE OF CORRECTION

PATENT NO. : 5,612,802

DATED : March 18, 1997

INVENTOR(S) : SHINJIRO OKADA ET AL.

It is certified that error appears in the above-identified patent and that said Letters Patent is hereby corrected as shown below:

COLUMN 3

Line 6, "film the" should read --film (the--.
    Line 10, "5" should be deleted.
    Line 21, "hat," should read --that,--.
    Line 24, "in" should read --on--.
    Line 28, "belt shaped" should read --belt-shaped--.
    Line 49, "ware" should read --water--.
    Line 54, "or by" should read --one--.
    Line 59, "portion belt-shaped" should read --portion (belt-shaped--.
    Line 63, "small" should read --little--.
    Line 67, "portion 44" should read --portion 44)--.

COLUMN 4

Line 8, "4B FLCs" should read --4B, FLCs--.
    Line 25, "desirable" should read --desirably--.
    Line 33, "4)" should read --5)--.
    Line 41, "form" should read --from--.

COLUMN 5

Line 1, "voltages $+V_S$" should read --voltages $\pm V_S$--.
    Line 16, "writing" should read --writing in--.
    Line 26, "canning" should read --scanning--.
    Line 27, "instance" should read --instance,--.
    Line 28, "section" should read --selection--.
    Line 33, "experts" should read --experiments--.

UNITED STATES PATENT AND TRADEMARK OFFICE
CERTIFICATE OF CORRECTION

PATENT NO.   :   5,612,802
DATED        :   March 18, 1997
INVENTOR(S)  :   SHINJIRO OKADA ET AL.

It is certified that error appears in the above-identified patent and that said Letters Patent is hereby corrected as shown below:

COLUMN 6

Line 5, "ing a" should read --ing: ¶ a--.
    Line 28, "pretilt" should read --pre-tilt--.

Signed and Sealed this

Ninth Day of September, 1997

Attest:

BRUCE LEHMAN

*Attesting Officer*      *Commissioner of Patents and Trademarks*